US012756754B2

(12) United States Patent
Mears et al.

(10) Patent No.: US 12,756,754 B2
(45) Date of Patent: Oct. 6, 2026

(54) EXECUTABLE OBJECTS IN A DISTRIBUTED STORAGE SYSTEM

(71) Applicant: NetApp, Inc., San Jose, CA (US)

(72) Inventors: Morgan Mears, Raleigh, NC (US); Mauricio Sánchez, Pleasant Garden, NC (US); Samuel Fink, Cary, NC (US); Brian Atkins, Durham, NC (US)

(73) Assignee: NetApp, Inc., San Jose, CA (US)

( * ) Notice: Subject to any disclaimer, the term of this patent is extended or adjusted under 35 U.S.C. 154(b) by 166 days.

(21) Appl. No.: 17/492,006

(22) Filed: Oct. 1, 2021

(65) Prior Publication Data

US 2023/0105531 A1 Apr. 6, 2023

(51) Int. Cl.

| | |
|---|---|
| ***H04L 67/01*** | (2022.01) |
| ***H04L 67/1008*** | (2022.01) |
| ***H04L 67/1087*** | (2022.01) |
| ***H04L 67/1097*** | (2022.01) |

(52) U.S. Cl.

CPC .......... *H04L 67/1097* (2013.01); *H04L 67/01* (2022.05); *H04L 67/1008* (2013.01); *H04L 67/1089* (2013.01)

(58) Field of Classification Search

CPC . H04L 67/1097; H04L 67/01; H04L 67/1008; H04L 67/1089; H04L 67/1036; H04L 67/1012

USPC .......................................................... 707/756

See application file for complete search history.

(56) References Cited

U.S. PATENT DOCUMENTS

| | | | | |
|---|---|---|---|---|
| 12,321,778 | B1 * | 6/2025 | Costa Tomas | G06F 9/4825 707/707 |
| 2015/0169436 | A1 * | 6/2015 | Tamilmani | G06F 8/24 717/124 |
| 2015/0213011 | A1 * | 7/2015 | George | H04L 67/1097 707/802 |
| 2019/0034087 | A1 | 1/2019 | Renauld et al. | |
| 2019/0370360 | A1 * | 12/2019 | Mainali | G06F 3/067 |

* cited by examiner

*Primary Examiner* — Alexandria Y Bromell

(74) *Attorney, Agent, or Firm* — Jaffery Watson Hamilton & DeSanctis LLP

(57) ABSTRACT

Systems, methods, and machine-readable media are disclosed for running an executable object on an object storage system. An executable object including executable code is stored on a first storage node of an object storage system. The first storage node receives a request to run the executable object. The first storage node identifies the physical location of one or more data objects of interest to be processed by the executable object. The first storage node runs the executable object to process the identified one or more data objects. The first storage node receives a request from a second storage node of the object storage system for the executable object in response to one or more data objects of interest being located at the second storage node. The first storage node sends a copy of the executable object to the second storage node.

20 Claims, 6 Drawing Sheets

EXECUTABLE OBJECTS IN A DISTRIBUTED STORAGE SYSTEM

TECHNICAL FIELD

The present description relates to running executable objects, and more specifically, to a system, method, and machine-readable storage medium for running executable objects in a distributed storage system for cost savings and/or improved efficiency.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers to provide data and manage its flow. Improvements in distributed storage have given rise to their use across many industries and applications that make regular use of the stored data.

Some cloud providers may charge for the amount of storage used which may include transferring the data to the storage. Some cloud providers may also charge to transfer data out of the storage. In current approaches, deriving value from the stored data typically involves transferring the data from storage to a compute node to be processed or analyzed. As the size and amount of data stored increases, so too does the cost of deriving value from that data, both financially as well as in terms of resource use. For example, transferring data utilizes compute resources, memory resources, and network resources, and can be both time-consuming and resource-intensive because of the extra copying and processing (including memory copies, network transfers, temporary disk copies, etc.).

Moreover, for many object storage applications the object storage node(s) have unused compute and memory resources, such as after storing a large amount of data in the storage node(s). These unused resources represent a lost opportunity for better resource utilization, as well as cost and resource efficiencies by reducing the amount of data transferred out of, and into, the storage.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method includes storing, by a node in an object storage system, an executable object in the node. The method further includes receiving, by the node, a request to run the executable object. The method further includes identifying, by the node, one or more data objects stored on the node to be processed by the executable object. The method further includes aggregating, by the node, the one or more data objects for processing by the executable object. The method further includes running, by the node, the executable object on the node to process the one or more data object stored on the node.

In an additional aspect of the disclosure, a computing device includes a memory containing having stored thereon instructions for performing a method of running an executable object on an object storage system. The computing device further includes a processor coupled to the memory, the processor configured to receive, by a first node of the object storage system, an execute instruction for running an executable object to process one or more data objects of interest. The processor is further configured to identify, by the first node, a first set of the one or more data objects to be processed by the executable object, the first set of the one or more data objects being stored on the first node with the executable object. The processor is further configured to receive, by the first node, a request from a second node of the object storage system for the executable object in response to a second set of the one or more data objects being located at the second node. The processor is further configured to send, by the first node, a copy of the executable object to the second node in response to the request from the second node. The processor is further configured to run, by the first node, the executable object to process the first set of the one or more data objects stored on the first node in response to being in an active execution state.

In an additional aspect of the disclosure, a non-transitory machine-readable medium having stored thereon instructions for performing a method of running an executable object on an object storage system, when executed by at least one machine, causes the at least one machine to receive, by a first node of the object storage system, execute instructions from a client for running an executable object on the first node, the execute instructions being received via the object storage system. The instructions, when executed by the at least one machine, further causes the at least one machine to identify, by the first node, a first set of data objects to be processed by the executable object. The instructions, when executed by the at least one machine, further causes the at least one machine to run, by the first node, the executable object to process the first set of data objects that are on the first node with the executable object. The instructions further cause the at least one machine to receive, by the first node, a request from the client for information about the first set of data objects while running the executable object, the request the client bypassing the object storage system. The instructions further cause the at least one machine to respond, by the first node, to the request from the client, the response bypassing the object storage system when sent to the client.

Other aspects will become apparent to those of ordinary skill in the art upon reviewing the following description of exemplary embodiments in conjunction with the figures. While one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

The present disclosure is best understood from the following detailed description when read with the accompanying figures.

DETAILED DESCRIPTION

Figure 1:
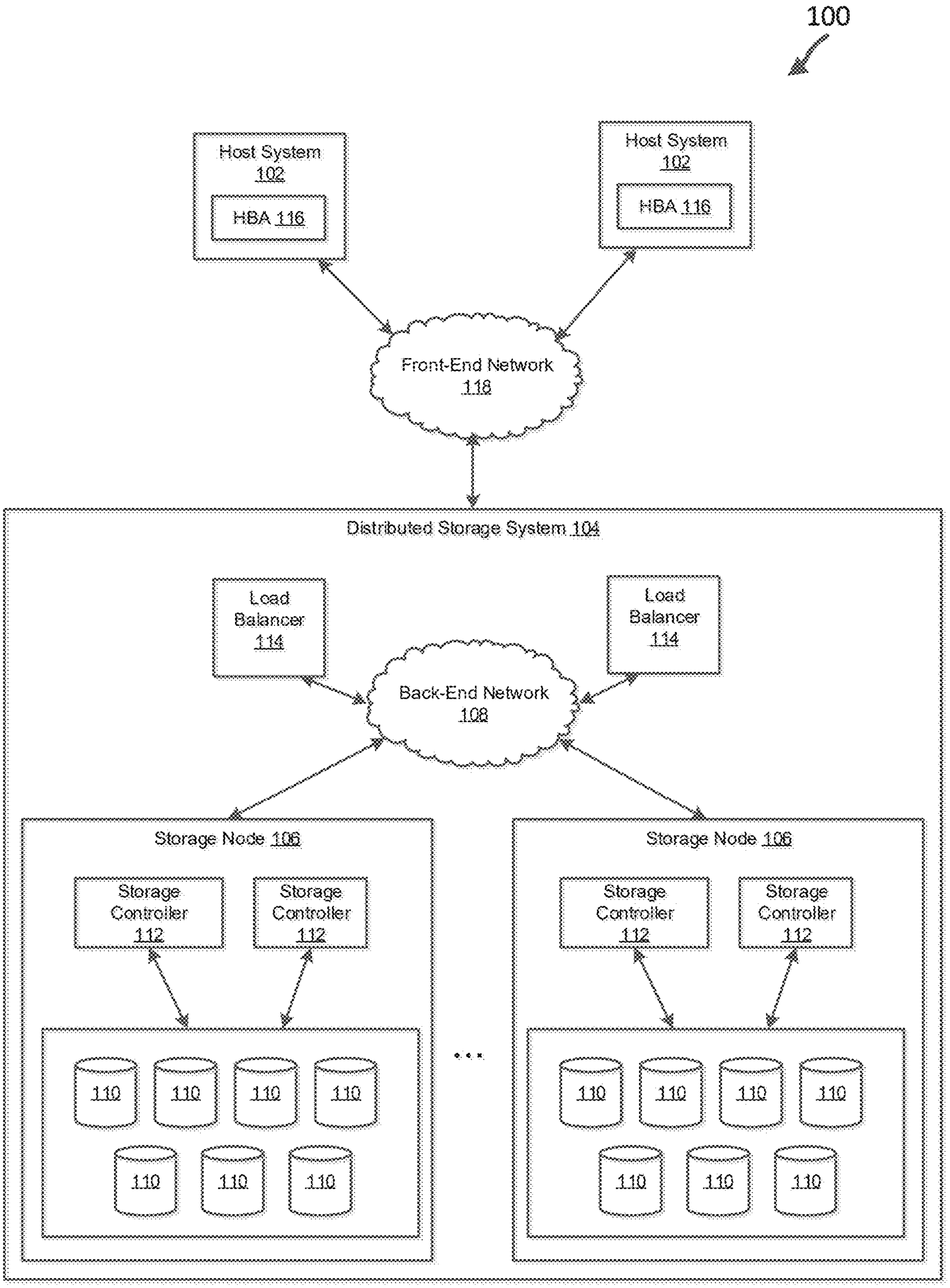
FIG. 1 illustrates a schematic diagram of a computing architecture according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for running executable objects on storage nodes of an object storage system. These executable objects, also identifiable as active objects, is a paradigm and framework that enables the use of unused compute and RAM capacity on object storage nodes to efficiently derive value from storage data, increasing the value of the object storage solution to users and avoiding resource consumption that would otherwise have been imposed by data access protocols if that same data processing were performed by an entity external to the object storage system.

In detail, these and other aspects may be accomplished by storing executable code as an object in the object storage system, identifying the object as an executable object, identifying data objects of interest to be processed by the executable object, and running the executable object on the object storage system. By running the executable object at the storage node of the object storage system where the data objects of interest are kept, overall performance of the system may be improved by not transferring data objects out of the data object storage system to be processed. In general, while embodiments of the present disclosure may be discussed with reference to storage nodes of an object storage system, this is for simplicity of discussion only. Embodiments of the present disclosure are applicable to object storage systems generally, such as cloud storage platforms, server storage platforms, on-premises storage platforms, etc. The examples described below may refer to storage nodes to provide illustration of details to the disclosure.

Object storage systems differ from file storage systems in structure and operation. A file storage system stores data files and executables in a directory based hierarchical filesystem. A hierarchical filesystem is a tree structure including directories, data files, and executables that are nested within another directory. Each directory, data file, or executable is addressable using the hierarchical structure of the filesystem. This allows for data files and executables to have the same name as other data files and executables if stored in different directories. Filesystems allow for data files and executables to be coresident in storage (e.g., hard drive (HDD), solid state drive (SSD), CD-ROM, etc.). The executables are run on a central processing unit (CPU) and may process and/or manipulate data files stored within the filesystem. For example, the CPU of a personal computer may copy the executable from storage to random access memory (RAM) or cache to be run. The CPU, running the executable, may modify and/or process the data files in storage.

An object storage system stores data as objects in a flat address space. Objects stored in a flat address space are all stored at the same level, therefore this no nesting or directories. Each object is directly accessible without the need for a hierarchical structure; hence each object name must be unique form all other object names. Objects may be stored in buckets which are logical containers for storing objects. Buckets may be associated with policies that determine which actions a user can perform on a bucket and the objects contained within the bucket. Further, each object includes the object itself and the metadata about the object. As will be discussed in further detail below, object storage systems may include multiple nodes located in physically different locations. As an analogy, an object storage system may be considered similar to an HDD in that it is used for storing data. When data is to be processed, the data must be copied from the object storage system to another system that is typically referred to as a compute node. The compute node may process and/or modify the data that is copied from the object storage system.

This process of copying data housed in an object storage system to a compute node can be time-consuming, resource-intensive, and financially expensive. These problems may be considered part of doing business in order to derive value from the data stored in object storage. As described further below, object storage systems include resources, such compute and memory resources, for storing and retrieving data from the object storage system. These resources may remain idle when no data is being stored or retrieved. Storing executable code in executable objects on the object storage system to be run using the otherwise idle resources of the object storage system may reduce the amount of time, resources, and cost required to derive value from data stored in the object storage system.

Objects storing executable code will be referred to as executable objects going forward to distinguish from objects that contain data, which may be referred to as data objects or as objects. Metadata of the executable objects may be used to mark them as executable. The executable code of the executable object may be configured to execute within the nodes of an object storage system (e.g., storage nodes, cloud storage clusters, etc.) so that processing and changes to data objects occurs within the storage node. In some examples, the executable objects may use protocols for accessing the data objects that are different than the object storage protocols through which the data objects are typically accessed.

In further examples, existing object storage protocols may be modified (e.g., extended) to allow for the creation of executable objects, as well as for the execution (e.g., running) of executable objects within the object storage system (i.e., instead of transferring to a compute node for processing). Some examples of object storage protocols include S3, Azure Blob, and Swift. Such modifications, or extensions, to existing protocols may allow a client to identify an object as executable and control the execution of the executable object against a set of defined data objects. The protocol extensions may further allow a client to control permissions of the executable objects as well as their execution. While such extensions are not necessary for running executable objects, they may reduce the chance of collisions between existing object storage protocol use and the use of executable objects that may occur by overloading existing protocol(s). Such collisions in use may result in errors occurring within the object storage system, which may be avoided by these extensions.

The object storage protocol may include data selection criteria used to identify data objects of interest within the storage system (e.g., within storage nodes, cloud storage clusters, etc.) to be processed by the executable object. Aspects of the present disclosure provide for the generation of data location maps for data objects that are stored in the object storage system (e.g., on a per-node basis). For example, each node within the object storage system may maintain an index of objects stored within the node. The data location maps may be generated by filtering the object index to identify data objects within the node that match the specified data selection criteria. Examples of data selection criteria may include bucket names, object names, prefixes, tags, and/or other metadata. In some examples, the object storage system may further aggregate the data maps of the respective nodes of the system to provide a single cluster wide view of the data location maps. The executable object may use the data location maps during operation to find the data objects of interest.

In further examples, the object storage system may generate an overlay filesystem view from the physical location data maps to be used by the executable objects. In some examples, the overlay filesystem view may be generated from previously generated data maps. The generated overlay filesystem view may allow for efficient reuse of older, legacy code within the executable objects by converting the flat address space of the object storage system to a synthetic hierarchical filesystem view that older code was designed to use. For example, the synthetic filesystem view may use characters in the object name, bucket name, and/or metadata as delimiters, thereby creating synthetic filesystem directories. The synthetic hierarchical filesystem view enables the executable object to access the data object in place (e.g., "zero copy" access) through the use of kernel level translations from the synthetic filesystem view to the object data as it exists on the disk. This overcomes one of the largest limitations of object storage protocols by eliminating resources spent sending and receiving object data using standard protocols. Furthermore, this provides the advantage of presenting all data objects to a user as existing in a single volume while being physically located across different nodes of the object storage system.

In addition to the aspects described above, or alternatively, executable objects according to some embodiments of the present disclosure may be replicated from one node of the object storage system to another node of the object storage system in order to facilitate processing of the data objects at the nodes in which they are physically located. In some examples, the object storage system may copy the executable object to all relevant nodes of the object storage system. In some other examples, nodes that have identified at least one data object to be processed may request, or pull, a copy of the executable object from another node which has a copy of the executable object already.

An executable object may further be associated with a client-side application. For example, an application running outside of the object storage system may be designed to work with an executable object running inside the object storage system to process data stored in the object storage system. The executable objects may be used to maintain a partially processed, or application aware, index of data stored in the object storage system, including the location of the data. The executable objects may communicate directly with the external application without using object storage protocol(s) (e.g., S3, Azure, Swift, etc.). Direct communication between the client-side application and the executable object may allow for pre-loading of frequently used objects and improved latency and performance as compared to traditional object retrieval mechanisms (e.g., object storage protocols).

One or more of the aspects described above may be applied in a manner that improves upon existing pipelining paradigms. For example, executable objects may be used to provide in-place data-centric pipelining. That is, instead of moving data out of the object storage system to compute nodes for processing by executables (as with existing pipelining paradigms), executable objects may be moved into the object storage system to process the data in place according to the embodiments introduced above and further described in various examples below. For example, similar to a data object, a client (e.g., host, client-side application, user, etc.) may use an object storage protocol (e.g., S3, Azure, Swift, etc.) to send a request to store an executable object to the object storage system. Because the size of the executable objects will generally be much smaller than the size of the data being processed, efficiency improvements are realized by not copying data out of the object storage system. The efficiency improvements include reduced network use and latency improvements. In some examples, the executable objects may be spawned on multiple nodes to process the data objects at those nodes in parallel to each other. In some other examples, the executable objects may be spawned on multiple nodes (e.g., in parallel or serially) and process the data serially to each other. This may include processing a first portion of data on a first node (e.g., by running the executable object at the first node until processing of that first portion of data is completed), transferring an execution state of the executable object to a second node where a second portion of data resides, and then processing data on the second node.

Object storage systems according to embodiments of the present disclosure provide improved processing capabilities to users over current object storage systems. Executable objects improve the speed and efficiency by which data may be processed in an object storage system as compared to systems without executable objects (since systems without executable objects process data by transferring the data from storage to a compute node to be processed or analyzed, and then returned, etc.). The data may be processed by the object storage system without expending the time and resources necessary to copy data from the object storage system to a compute node. The time and resource savings increase as the amount of data to be processed increases. Moreover, the use of executable objects may provide the end user with significant cost savings for object storage systems whose cost structures are at least partially based on the amount of data transferred out of the object storage system.

FIG. 1 is a schematic diagram of a computing architecture 100 according to one or more aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID® system, an OpenStack® Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, the storage nodes 106 are coupled by a transmission control protocol/Internet protocol (TCP/IP) back-end network 108, which may be local to a rack or datacenter, although additionally or in the alternative, the network 108 may extend between sites in a WAN configuration or be a virtual network extending throughout a cloud. As can be seen, the storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and/or other considerations. As will be discussed throughout, the methods and systems disclosed herein improve the ability to derive value from the data stored in the storage nodes 106 regardless of the physical distance between the different storage nodes 106 (as well as from hosts 102).

In the illustrated embodiment, the computing architecture 100 includes a plurality of storage nodes 106 in communication with a plurality of hosts 102. It is understood that for clarity and ease of explanation, only a limited number of storage nodes 106 and hosts 102 are illustrated, although the computing architecture 100 may include any number of hosts 102 in communication with a distributed storage system 104 containing any number of storage nodes 106. An example storage system 104 receives data transactions, executable object manipulation instructions, and/or execute instructions from the hosts 102. If a data transaction (e.g., requests to read and/or write data) is received from the hosts 102, the storage system 104 takes an action such as reading, writing, or otherwise accessing the requested data so that the storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure, and likewise appear to be directly connected (local) to the hosts 102.

If an executable object manipulation instruction is received (e.g., to store an executable object at one or more storage nodes, replicate an executable object at other storage nodes, generate or update an overlay filesystem view at one or more nodes, etc.), the storage system 104 (e.g., one or more storage nodes 106) may perform the requested operation(s). This allows a host 102 to manipulate and control where and how executable objects run, according to the present disclosure. If an execute instruction (e.g., run executable code of an executable object to process stored data) is received from the hosts 102, the storage system 104 (e.g., one or more storage nodes 106) may execute the executable code of the executable object so that the storage system 104 appears to be one or more additional compute nodes that are connected to the hosts 102. This allows an application that is running on a host 102 to request that a storage node 106 run the executable code of the executable object to process data stored on the storage node 106 (e.g., stored on the storage devices 110). Further, one or more storage nodes 106 may receive instructions to run different instances of the same executable code (e.g., copies of an executable object) to process data stored on the one or more storage nodes 106.

With respect to the storage nodes 106, an exemplary storage node 106 contains any number of storage devices 110 in communication with one or more storage controllers 112. The storage controllers 112 may, according to aspects of the present disclosure, handle the data transactions and execute instructions directed to the storage node 106 on which the storage controllers 112 reside. The storage controllers 112 may also handle data transactions by exercising low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. At a high level, virtualization includes mapping physical addresses of the storage devices into a virtual address space and presenting the virtual address space to the hosts 102, other storage nodes 106, and other requestors. In this way, the storage node 106 represents the group of storage devices as a single device, often referred to as a volume. Thus, a requestor can access data within a volume without concern for how it is distributed among the underlying storage devices 110.

Further, the storage controllers 112 may handle execute instructions by executing (e.g., running) executable code of one or more executable objects stored on the storage devices 110 of the storage node 106 on behalf of the hosts 102. The storage controllers 112 may read the executable code from the executable object from the storage devices 110 and execute the code. The executable code may include instructions for processing data stored on the storage devices 110 so that processing of the data occurs within the storage node 106 (i.e., without transferring any of the data out of the storage node 106). In this way, the storage node 106 is used as a compute node, thereby removing the need to transfer data out of the storage node 106 on which the data is stored and removing any latency associated with such a transfer.

Further, an example storage node 106 may be connected to one or more cloud storage providers of varying levels (e.g., standard cloud storage or lower-class cloud storage, or both, for example, S3® or GLACIER® storage classes). The storage node 106 connected to one or more cloud storage providers may exercise protocol-level control over the allocated cloud storage space available to it on behalf of the hosts 102. Such control may be via one or more protocols such as HyperText Transfer Protocol (HTTP), HyperText Transfer Protocol Secure (HTTPS), etc. The storage node 106 may further send instructions to run the executable object stored on the cloud storage space on behalf of the hosts 102. Such control may be via current API protocols (e.g., S3, Azure, Swift, etc.) for managing data on the cloud storage space. In some embodiments, the API protocols may be modified (e.g., extended) to allow for better control of executable objects, as will be discussed further below with respect to subsequent figures. In this way, the modified, or extended, API may avoid collisions with current uses of the API and provide better control over executable objects stored in the cloud storage space. Collisions between current API uses and executable code API uses may result in errors occurring in the storage system. In yet other examples, the storage node 106 may instead request the data from the one or more cloud storage providers, and the executable object(s), and run the executable object on the relevant data objects at the storage node 106 before returning the data objects to the one or more cloud storage providers (or caching/storing locally if the data has become more in demand again).

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally, or in the alternative, a host 102 may initiate a data transaction by contacting one or more of the storage nodes 106 directly rather than contacting the load balancer 114. In some embodiments, the load balancers 114 may also inspect execute requests according to embodiments of the present disclosure, identify which storage nodes 106 contain the data identified in the execute request, and which storage nodes 106 do not. For example, load balancers 114 may maintain a listing of collections of data (e.g., volumes) and identify which storage nodes 106 store the data requested in execute instructions. In this way, the load balancers 114 may reduce the workload of the storage nodes 106 that do not contain any of the requested data by forwarding the execute instructions to only those storage nodes 106 that may include the data requested. This operation may alternatively be performed by another entity, such as a storage node 106 and/or a host 102.

Turning now to the hosts 102, a host 102 includes any computing resource that is operable to exchange data with the distributed storage system 104 by providing (initiating) data transactions to the distributed storage system 104, providing executable object manipulation instructions, and/or providing execute instructions (and receiving any results). In an example embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include serial attached small computer system interface (SCSI), iSCSI, InfiniBand, Fibre Channel, and/or Fibre Channel over Ethernet (FCoE) bus adapters. Other suitable protocols include serial advanced technology attachment (SATA), eSATA, parallel advanced technology attachment (PATA), universal serial bus (USB), and FireWire, or the like. In some examples, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, execute/process, etc.) remote data, the HBA 116 of a host 102 sends one or more data transactions and/or execute instructions to the load balancer 114 or to a storage node 106 via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information. Execute instructions may contain fields that encode data selection (e.g., regular expression, string comparison, etc.), executable code to be run (e.g., the executable object(s) stored on storage node(s) 106), and/or other information relevant to executing the code on the storage node 106.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic HDDs, SSD, or an optical memory (e.g., compact disk read-only memory (CD-ROM), digital versatile disk (DVD), Blu-ray disk (BD)); a video controller such as a graphics processing unit (GPU); a communication interface such as an Ethernet interface, a Wi-Fi (IEEE 802.11 or other suitable standard) interface, or any other suitable wired or wireless communication interface; and/or a user input/output (I/O) interface coupled to one or more user I/O devices such as a keyboard, mouse, pointing device, or touchscreen.

As described above, the storage system 104 may distribute the hosts' data across the storage nodes 106 for performance reasons as well as redundancy. The distributed storage system 104 may be an object-based data system. The storage system 104 may be a distributed object store that spans multiple storage nodes 106 and sites. In brief, object-based data systems provide a level of abstraction that allows data of any arbitrary size to be specified by an object identifier. Object-level protocols are similar to file-level protocols in that data is specified via an object identifier that is eventually translated by a computing system into a storage device address. However, objects are more flexible groupings of data and may specify a cluster of data within a file or spread across multiple files. Each object may be stored on single node or may be fragmented and stored across multiple nodes or hosts within the object storage system. Object-level protocols include cloud data management interface (CDMI), SWIFT, and S3. A data object represents any arbitrary unit of data regardless of whether it is organized as an object, a file, or a set of blocks. Further, an executable object represents executable code able to be run by the storage system 104 (e.g., storage node 106).

A client may store content, for example, on the storage node 106 or an external service cloud. The term "content" may be used to refer to a "data object" or an "object." The storage node 106 may provide the client with a quicker response time for the content than if the content were stored on the external service cloud. It may be desirable for the client to store content that is frequently accessed and/or content that the client desires to be highly available on the storage node 106, and one or more executable objects pertaining to that content at the same storage node 106.

A host 102 may instruct the distributed storage system 104 to run an executable object, for example, on the same node 106 as the data (content) is stored, whether it be on the storage node 106 or an external service cloud. The term "executable object" may be used to refer to an object that contains executable code that is designed to run on the processors of the specific storage system on which it is stored (e.g., x86, x64, ARM, etc., whether as part of a storage controller 112 and/or a processor of a storage device 110). The executable code may be compiled native machine code, code written in a scripting language (e.g., Python, Ruby, Lua, JavaScript, etc.), and/or bytecode that is executed in a runtime environment (e.g., Java). The "executable object" may further include metadata indicating execute permissions of the executable object. The storage node 106 and external service cloud may provide a host 102 with a quicker response time by running the executable object locally on the data stored on storage node 106 as opposed to transferring the data to a compute node that is external to storage node 106 and/or external service cloud. Further, whether the response time is quicker or not, running the executable object locally may significantly reduce the amount of traffic between the storage node 106 and host 102, as data is not pulled from the storage 106 for processing at the host 102. This further saves the system from the data transfer burden and potential cost associated therewith.

Figure 2:
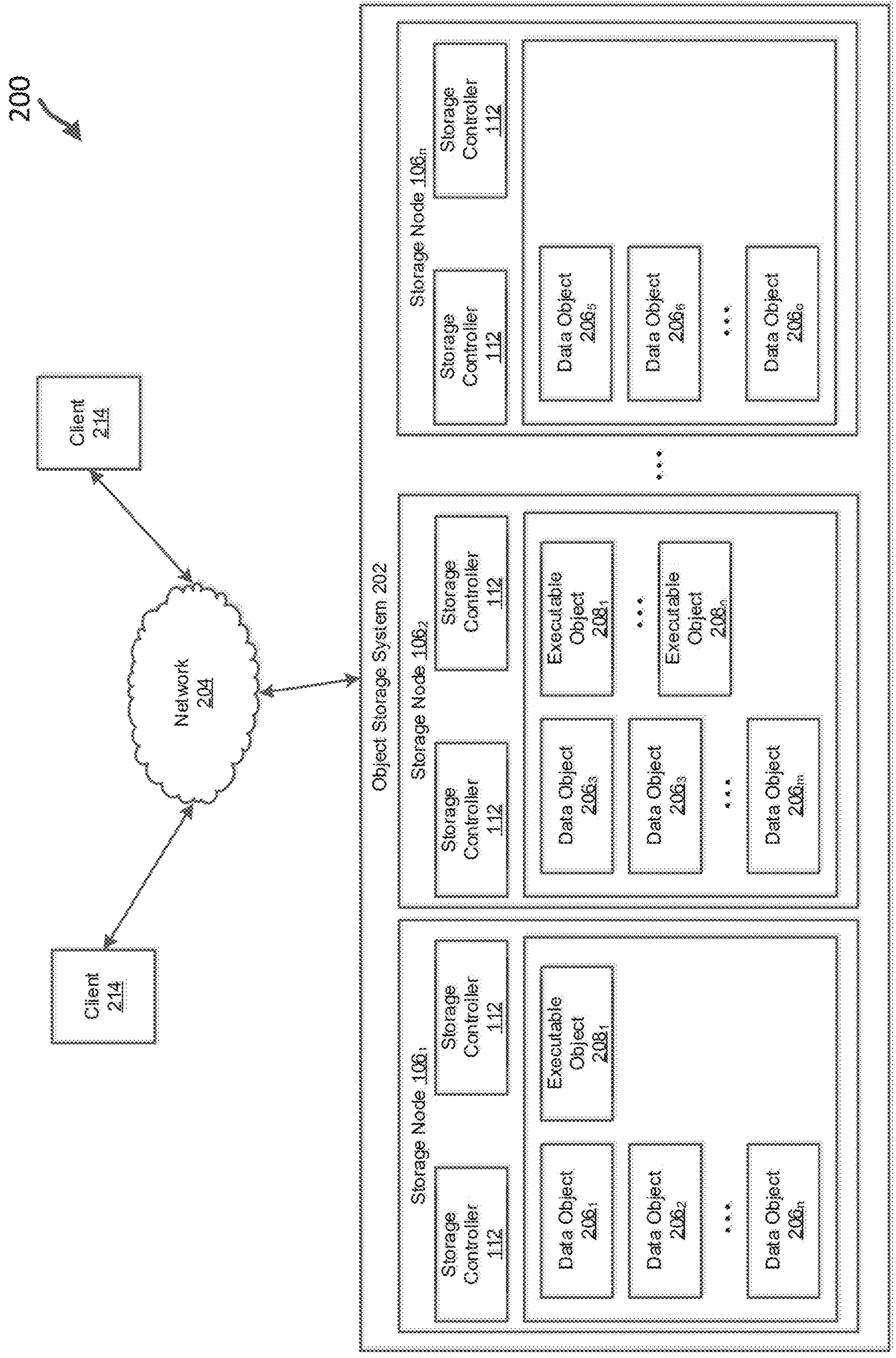
FIG. 2 illustrates a schematic diagram of a relationship between data objects and executable objects at one or more storage nodes of an object storage system according to one or more aspects of the present disclosure.

FIG. 2 is a schematic diagram of a computing architecture 200 according to aspects of the present disclosure. The computing architecture 200 may be an embodiment of the computing architecture 100 as introduced and discussed above. The computing architecture 200 includes an object storage system 202, a network 204, and clients 214. The network 204 may be similar to the network 118, which may include any number of wired and/or wireless networks such as a LAN, an Ethernet subnet, a PCI or PCIe subnet, a switched PCIe subnet, a WAN, a MAN, the Internet, or the like. The clients 214 may be an embodiment of the hosts 102. The clients 214 may communicate with the object storage system 202 via the network 204. The object storage system 202 may be an embodiment of the distributed storage system 104 and include one or more storage nodes, labeled as storage node $\mathbf{106}_1$, storage $\mathbf{106}_2$, and up to storage node $\mathbf{106}_n$. The storage nodes may also be referred individually or collectively as storage node(s) 106. Each storage node 106 may store one or more data objects, labeled as data object $\mathbf{206}_1$, data object $\mathbf{206}_2$, and up to data object $\mathbf{206}_n$. The data objects may also be referred to individually or collectively herein as data object(s) 206. Each storage node 106 may further store zero or more executable objects, labeled as executable object $\mathbf{208}_1$ up to executable object $\mathbf{208}_n$. The executable objects may also be referred to individually or collectively herein as executable object(s) 208.

The illustrated object storage system 202 of FIG. 2 includes three exemplary storage nodes 106. Each storage node 106 includes one or more storage controllers 112 (e.g., in a high-availability configuration in some examples). In some embodiments, the storage controllers 112 perform the read, write, modify, and execute actions within the storage node 106. Each storage node 106 further includes storage devices for storing data objects 206 and executable objects 208. In the illustrated example, storage node $\mathbf{106}_1$ stores data object $\mathbf{206}_1$, data object $\mathbf{206}_2$, up to data object $\mathbf{206}_n$ and an executable object $\mathbf{208}_1$. Further, illustrated storage node $\mathbf{106}_2$ stores data object $\mathbf{206}_3$, data object $\mathbf{206}_4$, up to data object $\mathbf{206}_m$ and executable object $\mathbf{208}_1$ up to executable object $\mathbf{208}_n$. And storage node $\mathbf{106}_3$ stores data object $\mathbf{206}_5$, data object $\mathbf{206}_6$, up to data object $\mathbf{206}_o$. Each data object 206 may represent a whole object stored in the object storage system 202. As illustrated, each storage node 206 stores different, unique data objects 206. However, data may also be replicated across storage nodes 106 for redundancy purposes such that data object $\mathbf{206}_1$ is the same object as data object $\mathbf{206}_3$. Additionally, or alternatively, data may be split across multiple data objects 206 and stored on different storage nodes 106. For example, data object $\mathbf{206}_3$ may include a first portion of data and data object $\mathbf{206}_6$ may include a second portion of data where the combination of data object $\mathbf{206}_3$ and data object $\mathbf{206}_6$ represents the specific data item. The data objects 206 may be stored on one or more storage devices 110 at their respective storage nodes 106.

As illustrated, while storage nodes 106 can store one or more executable objects 208, some might not store an executable object 208 at all. Furthermore, each executable object 208 may be stored on more than one storage node 106 (e.g., replicated as needed or desired). Each executable object 208 may be configured to execute within the storage node 106 of the object storage system 202. That is, the code may be compiled to run on the processor architecture (e.g., x86, x64, ARM, etc.) of the storage node 106 or be written in a scripting language (e.g., Python, Ruby, Lua, JavaScript, etc.) that may be interpreted by the storage node 106. This may include, for example, storing executable code in the executable object 208 that is able to be run, or executed, by the storage controller 112. As another example, this may include executable code in the executable object 208 that is able to be run, or executed, by a processor of a storage device 110.

The clients 214 may communicate with the object storage system 202 using a standardized object storage protocol (e.g., S3, Azure, Swift, etc.) or another suitable communication protocol. In some embodiments using the object storage protocol may be extended, or modified, to include the ability to store an executable object 208 in the object storage system 202, to allow the clients 204 to identify the executable object as executable, to control the execution of the executable object 208 on the object storage system 202, to control permissions of the executable object 208, and to identify a set of data objects 206 for the executable object 208 to process. For example, the object storage protocol may be extended (e.g., include additional headers related to the creation, storage, modification, and execution of executable objects 208 within the object storage system 202) to provide a matching expression (e.g., regular expressions) that identifies a subset of data objects 206 of interest within the object storage system 202.

In addition to the data objects 206 and the executable objects 208 (and the metadata stored as part of each type of object with that object), each storage node 106 may also store general metadata associated with the data objects 206 and the executable objects 208. For example, each storage node 106 may maintain a local index of objects stored on the storage node 106 (an example of general metadata). The index may also include some or all of the immutable metadata (e.g., creation time, etc.) of the data objects 206. The selection information may include regular expressions, string comparisons, and/or other methods of identifying data objects 206 of interest based on bucket names, object names, prefixes, tags, and/or other metadata. The selection information may be used to filter the data objects 206 in the local index. The storage node 106 may generate a physical location map based on the filtered data objects 206 of interest. The storage node 106 may further aggregate the physical location map with the physical location maps of other storage nodes 106 to create a cluster-wide view physical location map of all data objects 206 of interest. The storage node 106 may further provide the physical location map(s) to the executable objects 208 in order to identify the data objects 206 of interest. In some examples, the storage node 106 may use the physical location maps to generate an overlay filesystem view. The filesystem view provides a synthetic hierarchical representation of the flat object address space. An executable object 208 may incorporate legacy code that is designed to work with a hierarchical filesystem view.

Executable objects 208 may be replicated from one storage node 106 to another storge node 106. In some examples, an executable object 208 may be replicated as part of a request from client 214 to run the executable object 208 on the object storage system 202. For example, the client 214 may send a request to the object storage system 202 including a matching expression to identify data objects 206 of interest to process, an identifier of an executable object 208 (e.g., executable object $\mathbf{208}_1$) to run, and instructions to run the executable object 208. The matching expression may identify data object $\mathbf{206}_1$, data object $\mathbf{206}_2$, and data object $\mathbf{206}_3$ for processing (as an example). The object storage system 202 may provide the request to each of the storage nodes 106 (e.g., storage node $\mathbf{106}_1$, storage node $\mathbf{106}_2$, and up to storage node $\mathbf{106}_n$). The object storage system 202 may store the executable object $\mathbf{208}_1$ on each of the storage nodes 106. Each storage node 106 may use the matching expression included in the request to determine whether any data objects 206 of interest are stored on the storage node 106. For example, storage node $\mathbf{106}_1$ may determine data object $\mathbf{206}_1$ and data object $\mathbf{206}_2$ match the matching expression, storage node $\mathbf{106}_2$ may determine that data object $\mathbf{206}_3$ matches the matching expression, and storage node $\mathbf{106}_n$ may determine that no data objects 206 match the matching expression. Storage node $\mathbf{106}_1$ and storage node $\mathbf{106}_2$ may then run the executable object $\mathbf{208}_1$ according to the received instructions.

Alternatively, the object storage system 202 may forward the request to each of the storage nodes 106 (e.g., storage node $\mathbf{106}_1$, storage node $\mathbf{106}_2$, and up to storage node $\mathbf{106}_n$) but store the executable object 208 (e.g., executable object $\mathbf{208}_1$) on a single storage node (e.g., storage node $\mathbf{106}_1$). After identifying data object $\mathbf{206}_3$ as matching the matching expression, storage node $\mathbf{106}_2$ may request a copy of the executable object $\mathbf{208}_1$ from storage node $\mathbf{106}_1$. Storage node $\mathbf{106}_2$ may then run the executable object $\mathbf{208}_1$ according the received instructions.

Alternatively, the storage node $\mathbf{106}_1$ in this example may determine from one or more physical location maps to push the executable object 208 to storage node $\mathbf{106}_2$ when one or more of the data objects 206 at storage node $\mathbf{106}_2$ matches the expression. As demonstrated in the above example, the storage system 202 provides an improvement over existing pipelining paradigms that rely on moving large amounts of data out of a storage system to a compute system, and back to the storage system using large amounts of network resources. In contrast, the data-centric pipelining described herein moves small applications (e.g., executable objects 208) into a storage system to process the data in place. Such in-place data-centric pipelining decreases the amount of network resources used and may increase the speed of processing the data. Aspects of the present disclosure are discussed below with respect to the additional figures.

Figure 3:
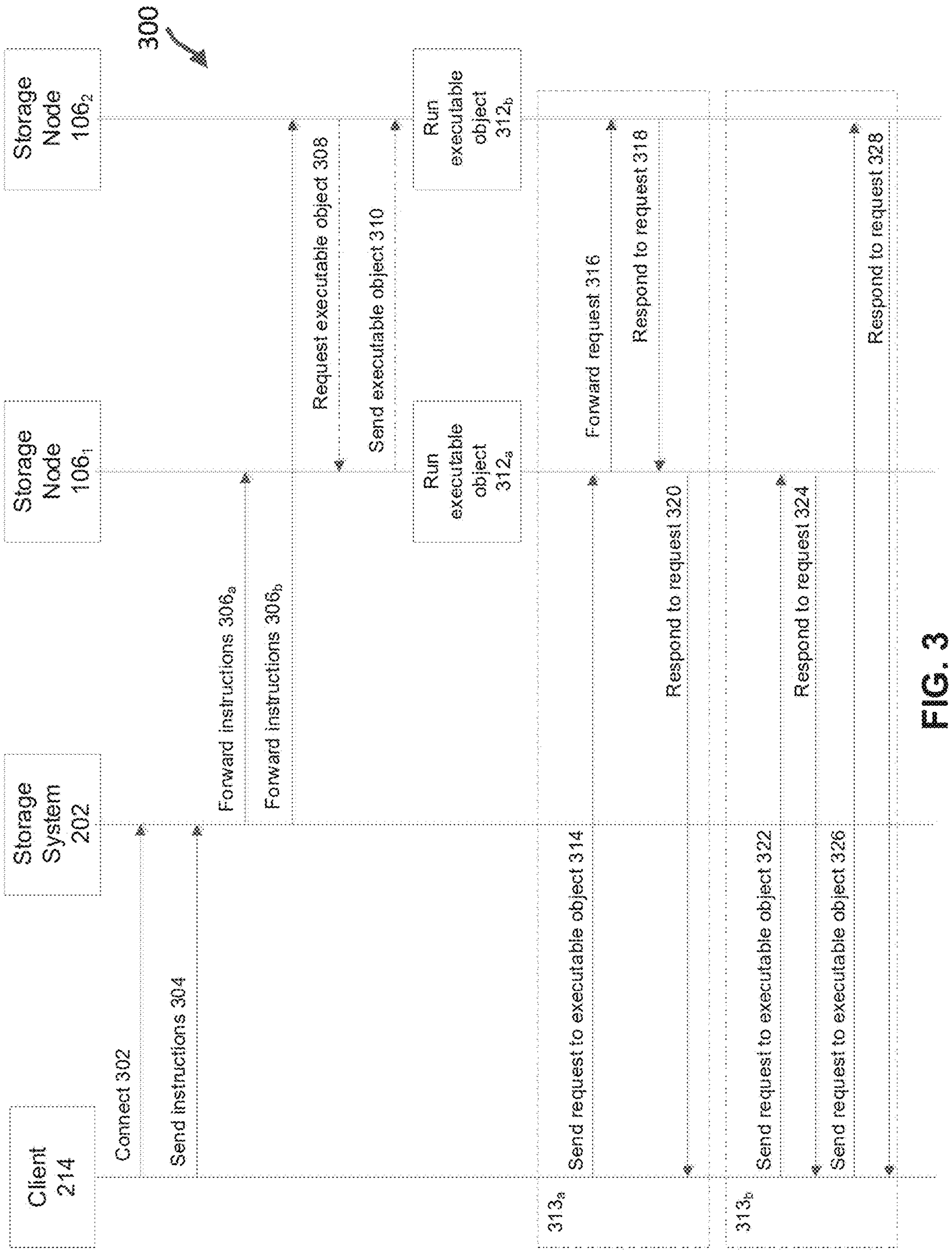
FIG. 3 illustrates a process flow for running executable objects in an object storage system according to one or more aspects of the present disclosure.

Turning now to FIG. 3, illustrated is an exemplary process flow 300 for running executable objects in an object storage system according to some embodiments of the present disclosure. Process flow 300 illustrates a flow between a client 214, a storage system 202, a storage node $\mathbf{106}_1$, and a storage node $\mathbf{106}_2$ as described above with respect to FIGS. 1 and 2. It is understood that additional actions can be provided before, during, and after the actions of the process flow 300, and that some of the actions described can be replaced or eliminated for other embodiments of the process flow 300.

At action 302, the client 214 connects to the storage system 202. The client 214 may connect to the storage system 202 via a network such as network 118 or network 204 described above. The client 204 may connect using an object storage protocol (e.g., S3, Azure, Swift, etc., whether in an unmodified form, or modified with extensions as discussed herein). The connection may allow the client 214 access to the storage system 202 including read, write, modify, and execute permissions. In some embodiments, the communication from the client 214 may be from an application that has been designed to use executable objects running on the storage system 202. That is, instead of the application requesting the data objects be transferred from the storage system 202 for processing, the application transfers executable objects to the storage system 202, and/or instructions for processing the data objects within the storage system 202.

At action 304, the client 214 sends instructions to the storage system 202 for running an executable object 208 in the storage system 202. In some examples, this corresponds to when a related executable object 208 is already at the one or more storage nodes 106 which are a target of the instructions from client 214 (e.g., sending the ID of the executable object 208). In other examples, this corresponds to sending the executable object 208 itself to the storage node(s) 106 of interest in storage system 202, and/or instructions for replication or other manipulations of an executable object 208 at one or more nodes 106, followed by (or along with) instructions for running the executable object 208 on each of the one or more nodes 106. Additionally, or alternatively, the instructions may identify multiple executable objects 208 to run along with instructions for running the multiple executable objects 208. In some examples, the instructions may include both parameters for how to run the executable object 208 and instructions to run the executable object 208, while in other examples the instructions may simply include instructions to run the executable object 208 with default and/or existing parameters. Having connected to the storage system 202, the client 214 may send instructions to the storage system 202 using an object storage protocol (e.g., S3, Azure, Swift, etc.). In some embodiments, the object storage protocol may be overloaded in order to run the executable object. For example, the headers identifying a request to modify an object may be overloaded to run an executable object 208 when the ID of an executable object 208 is provided. In some other embodiments, the object storage protocol may be extended to include headers specifically for running an executable object 208.

Using an extended object storage protocol simplifies the process flow and reduces the chances for errors (as opposed to overloading an existing object storage protocol message). The instructions may include one or more parameters including selector information, executable code to be stored as an executable object 208, and/or the ID to an existing executable object 208. The selector information may be used to identify data object(s) 206 to be processed by the executable object 208 without knowing in advance the specific data object(s) 206 to be processed. The instructions may include an instruction to store an executable object 208 that may be included with the instructions. Alternatively, the instructions may include an object ID that identifies an already existing executable object 208 at one or more storage nodes 106 to be run. Other information relevant to the running of the executable object 208 and the processing of the data object(s) 206 may be included in the instructions sent by the client 214.

At action 306, the storage system 202 forwards the instructions to the storage nodes 206. In the illustrated embodiment, the instructions are forwarded individually to each storage node 106 in the storage system 202. For example, at action 306$_a$ the instructions are forwarded to storage node 106$_1$. The executable object included in the instructions may be forwarded to storage node 106$_1$ to be stored on the storage node 106$_1$. At action 306$_b$, the instructions may be forwarded to the storage node 106$_2$ without the executable object. As previously discussed, the executable object 208 included in the instructions may not be replicated to each storage node 106 along with the instructions. Instead, the object ID of the executable object 208 and object selector information may be forwarded to the storage node 106$_2$. Alternatively, the executable object 208 itself may be replicated along with the instructions. While illustrated as distinct actions, actions 306*a* and 306$_b$ may alternatively constitute the action 304, such that the client 214 communicates with the storage node(s) 106 without requiring forwarding first.

In an alternative embodiment, the storage system 202 may maintain a cluster-wide index of physical locations of data objects 206. In such an embodiment, the storage system 202 may forward the instructions to those storage nodes 106 that have stored data objects 206 identified by the instructions sent by the client 214.

At action 308, the storage node 106$_2$ may optionally request the executable object 208 from the storage node 106$_1$. The determination of whether or not the storage node 106$_2$ requests the executable object 208 may be based on whether any of the requested data objects 206 reside on the storage node 106$_2$ as determined by the selector information. After receiving the instructions, including the object selector information, the storage node 106$_2$ may filter its index of locally available objects based on the selector information included in the instructions. The selector information may include criteria such as, for example, regular expressions, string matching, etc. for identifying data objects 206 to be processed by the executable object 208. The selector information may incorporate whole or partial bucket names, object names, prefixes, tags, and/or other metadata, to name some examples.

For example, the storage node 106$_1$ may include several buckets named "logs," "genomes," and "records." The selector information may identify the "logs" bucket as the bucket containing the data objects 206 of interest. The selector information may further identify a subset of the log data based on the object names. For example, each object may be named according to a pattern such as "log_yyyy_mm_dd_hh_mm_ss" where the object name identifies a specific time period covered by the log where "yyyy" is the four digit year, "mm" is the two digit month, "dd" is the two digit day, "hh" is the two digit hours, "mm" is the two digit minutes, and "ss" is the two digit seconds. The logs of interest may be selected using a wildcard or regular expression such as "log_2020_06_15_*" that identifies all objects that include log information from Jun. 15, 2020. If one or more data objects 206 are identified by the selector information on the storage node 106$_2$ then the request for the executable object 208 may be sent.

At optional action 310, the storage node 106$_1$ responds to the optional request for the executable object 208 from optional action 308. The storage node 106$_1$ sends a copy of the executable object 208 to the storage node 106$_2$. A design decision may be made as to whether the storage system 202 operates by pushing executable objects 208 to all storage nodes or pulling executable objects 208 as needed. The illustrated example of FIG. 3 provides an example of pulling executable objects 208 as needed/desired.

Depending on the nature and/or location of the data object(s) 206 to be processed, pulling the executable object 208 may be a more efficient use of the storage system 202 resources than pushing the executable object 208. For example, in situations where the data object(s) 206 to be processed is concentrated in a small subset of storage nodes 106, this removes the overhead of copying the executable object 208 to storage nodes 106 that may not have need to run the executable object 208. Conversely, in an example where the data objects 206 are found on a majority of the storage nodes 106, pushing the executable object 208 may be more efficient to reduce the amount of extra network traffic created by pulling the executable object 208. In some embodiments, the storage system 202 may determine when to use a push or a pull scheme for replicating the executable objects (e.g., such that the system may either determine at one time to use either scheme, or may vary dynamically and automatically (or based on user instruction) between schemes). In some other embodiments, the client 214 may identify whether to use a push or a pull scheme for replicating the executable objects 208.

At action 312, the storage nodes 106 (all those that have the identified executable object 208 relating to the identified data object(s) 206) run the executable object 208 as instructed by the client 214. Running the executable object 208 may include processing and/or modifying any of the data objects 206 identified by the selector information included in the original instructions. This is an improvement on current pipelining paradigms. Data may be processed using fewer network resources by using the executable object 208 to provide in-place data processing (e.g., data-centric pipelining).

The executable object 208 is run by each respective storage node 106 in the storage system 202 that has the executable object 208 locally as well as the identified data objects 206 according to the instructions received. That is, at action 312$_a$ the storage node 106$_1$ runs the executable object 208$_1$ that is stored in the storage node 106$_1$ and at action 312$_b$ the storage node 106$_2$ runs the executable object 208$_1$ that is stored in the storage node 106$_2$. In some embodiments, the executable object may be run by storage controllers, such as storage controllers 112 (FIGS. 1, 2), located at each storage node 106. In some other embodiments, an additional compute resource, including at least a processor and RAM, may be included in each storage node 106 to run the executable objects 208, either adjacent to storage controllers 112 and/or as part of one or more storage devices 110. Additionally, or alternatively, multiple compute resources, including at least a processor and RAM, may be located at the storage system 202 level where each compute resource runs the executable objects 208 for one or more storage nodes 106. Varying levels of compute resources may also be run in some combination, either in parallel or serially, at a given storage node 106 for the data objects 206 at that node.

Boxes $\mathbf{313}_a$ and $\mathbf{313}_b$ illustrate different embodiments for handling communication between the storage nodes 106 and the client 214 while an executable object 208 is running. Referring to box $\mathbf{313}_a$, the storage nodes 106 are illustrated operating in a collaborative manner. This may refer, for example, to the storage node $\mathbf{106}_1$ (i.e., the executable object 208 running on the storage node $\mathbf{106}_1$) and storage node $\mathbf{106}_2$ (i.e., the executable object 208 running on the storage node $\mathbf{106}_2$) communicating with each other. The storage node $\mathbf{106}_1$ may communicate with the client 214 after receiving the initial instructions 304 to run the executable object 208. In this example, the storage node $\mathbf{106}_1$ may forward a request (e.g., additional requests that are not the instructions 304) to the storage node $\mathbf{106}_2$. Similarly, the storage node $\mathbf{106}_2$ may send any response to the request to storage node $\mathbf{106}_1$ for sending back to the client 214. Collaborative communication between the different storage nodes 106 may significantly reduce the amount of traffic between the storage nodes 106 and the client 214, and may also result in a quicker response time. Moreover, this saves the system from the data transfer burden and potential cost associated therewith.

At action 314, the client 214 sends a request to the executable object $\mathbf{208}_1$ running on the storage node $\mathbf{106}_1$. The request may include a status update, a request for more information, additional information for the executable object $\mathbf{208}_1$, or any number of requests from the client 214. Such requests are sent while an executable object 208 is running, for example responsive to action 304 (running at action 312). Notably, the request sent by the client 214 bypasses the storage system 202. As a result, the request may be sent by a protocol other than object storage protocol (e.g., S3, Azure, Swift, etc.) used to communicate with the storage system 202. The request may be a communication from an application running on the client 214 to the executable object $\mathbf{208}_1$ running on the storage node $\mathbf{106}_1$ (e.g., where the application and executable object $\mathbf{208}_1$ have been designed to work together to improve the performance of the application).

At action 316, still part of box $\mathbf{313}_a$'s example, the executable object $\mathbf{208}_1$ running on storage node $\mathbf{106}_1$ forwards the request from the client 214 to the executable object $\mathbf{208}_1$ running on storage node $\mathbf{106}_2$. Additionally, the executable object $\mathbf{208}_1$ running on storage node $\mathbf{106}_1$ may process the request received in order to respond to it appropriately.

At action 318, the executable object $\mathbf{208}_1$ running on the storage node $\mathbf{106}_2$ responds to the request. The executable object running on the storage node $\mathbf{106}_2$ processes the request and then responds to the request. In a collaborative process, as illustrated by box $\mathbf{313}_a$ the executable object running on the storage node $\mathbf{106}_2$ responds to the executable object $\mathbf{208}_1$ running on the storage node $\mathbf{106}_1$. In other words, the executable object $\mathbf{208}_1$ sends its response at action 318 from the storage node $\mathbf{106}_2$ to the executable object $\mathbf{208}_1$ running at storage node $\mathbf{106}_1$, instead of directly back to the client 214.

At action 320, the executable object running on the storage node $\mathbf{106}_1$ responds to the original request from the client 214 with the requested information. The executable object $\mathbf{208}_1$ running the storage node $\mathbf{106}_1$ includes the responses from the executable objects $\mathbf{208}_1$ running on the other storage node $\mathbf{106}_2$ (as a singular example, which may be scaled to any number of nodes) when responding to the client 214 with the requested information (e.g., status update information, confirmation that the additional information was received and incorporated, etc.) when sending the response back to the client 214.

Referring to the box $\mathbf{313}_b$, the storage nodes 106 are illustrated as communicating directly with the client 214. The aspects illustrated in box 313*b* may refer to situations where the client 214 communicates with the storage node $\mathbf{106}_1$ (i.e., the executable object running the storage node $\mathbf{106}_1$) and with the storage node $\mathbf{106}_2$ (i.e., the executable object running on the storage node $\mathbf{106}_2$). For example, the client 214 may send a request (i.e., an additional request that is not the instructions 204) separately and individually to both the storage node $\mathbf{106}_1$ and the storage node $\mathbf{106}_2$. This is in contrast to the collaborative example described above with respect to box 313*a*, where a request to one of the storage nodes 106 is conveyed via another storage node 106. In some situations, this may result in a faster response from the executable object 208 such as when the client 214 is addressing a single data object 206.

At action 322, the client 214 sends a request to the executable object running on the storage node $\mathbf{106}_1$. Again, examples of requests may include status updates, requests for more information, additional information, etc., targeting executable object(s) 208 that are already running. As discussed above with respect to action 314, the request may be sent by a protocol other than the object storage protocol (e.g., S3, Azure, Swift, etc.) used to communicate with the storage system 202.

At action 324, the executable object $\mathbf{208}_1$ running on the storage node $\mathbf{106}_1$ processes the request (e.g., as part of running its executable code for its intended purpose), and responds to the client 214, as has been previously described with respect to actions 318 and 320.

At action 326, the client 214 separately sends a request to the executable object running on the storage node $\mathbf{106}_2$, as has been previously described.

At action 328, the executable object $\mathbf{208}_1$ running on the storage node $\mathbf{106}_2$ processes the request and responds to the client 214 with the requested information (e.g., status updates, requests for more information, additional information, etc.). With respect to box $\mathbf{313}_b$, this may refer to each of the executable objects $\mathbf{208}_1$ at each of nodes $\mathbf{106}_1$ and $\mathbf{106}_2$ responding to the separate requests received at actions 322 and 324, respectively.

Figure 4:
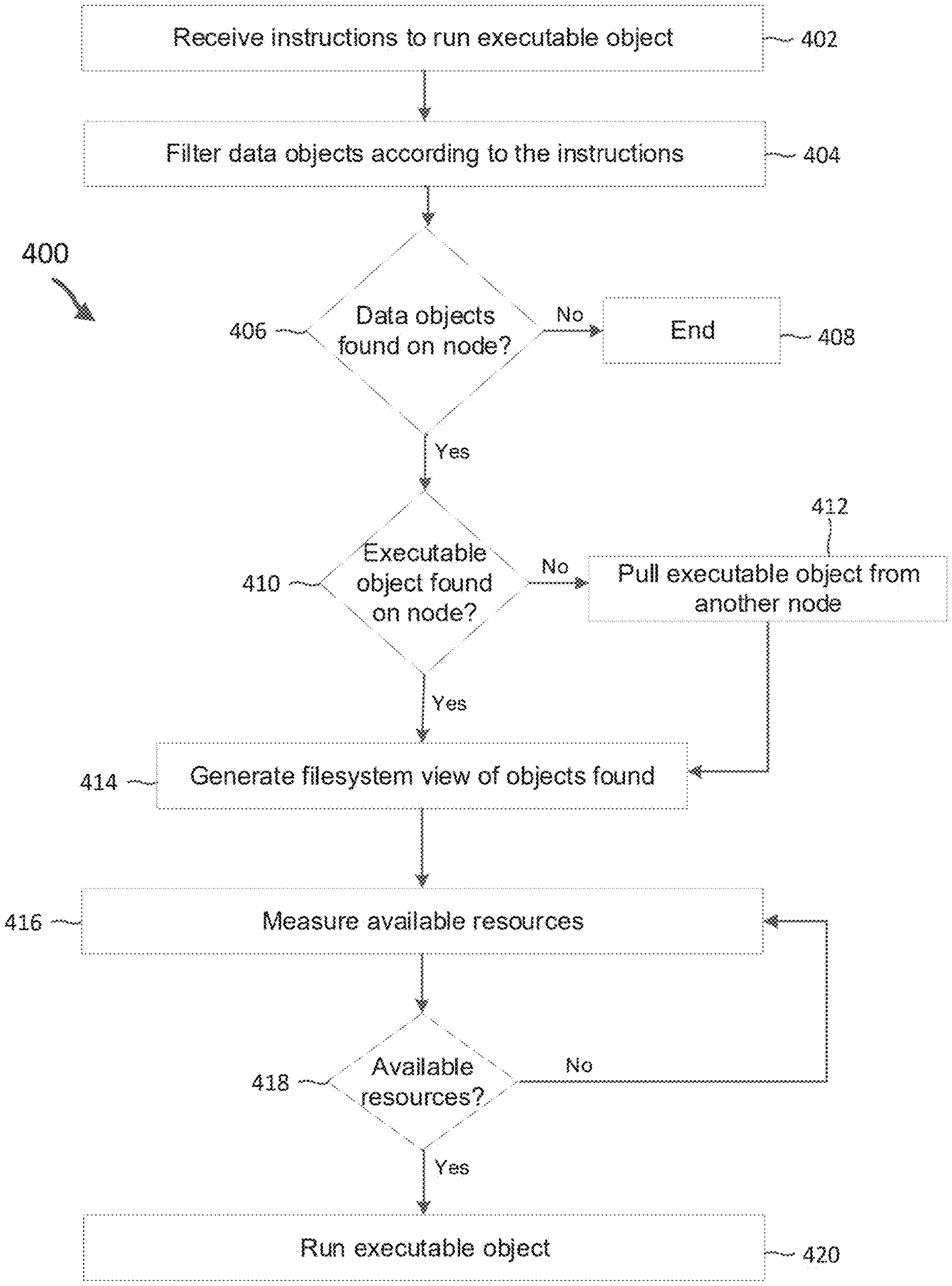
FIG. 4 illustrates a flow diagram of a method of running an executable object on a storage node of an object storage system according to one or more aspects of the present disclosure.

Having discussed the general process flow, FIG. 4 illustrates a flow diagram of running an executable object on a storage node according to embodiments of the present disclosure. In the description of FIG. 4, reference is made to elements of FIGS. 1 and 2 for simplicity of illustration. In an embodiment, the method 400 may be implemented by an exemplary storage node 106 that is part of a larger object storage system such as, for example, object storage system 202. In another embodiment, the method 400 may be implemented by an exemplary storage controller 112 that is part of a storage node 106. The description below will describe this with respect to a given storage node 106. It is understood that additional steps can be provided before, during, and after the steps of the method 400, and that some of the steps described can be replaced or eliminated for other embodiments of the method 400.

At block 402, the storage node 106 receives instructions to run an executable object (e.g. executable object 208 of FIG. 2), from a client 214. The instructions may be received via the object storage system 202, via another storage node 106, or directly from a client 214 described above. The instructions may be received using an object storage protocol such as, for example, S3, Azure, Swift, etc. In some embodiments, the object storage protocol may be extended to include additional headers designed specifically for handling executable objects 208 on the object storage system 202. The instructions may include selector information, an executable code to be stored as an executable object, and/or an ID of an executable object 208. The selector information may be used to filter objects stored on the storage node 106 to identify data to be processed by the executable object 208. The executable code stored in the executable object may be configured to run on the storage node 106. For example, the code may be compiled to run on processors of the storage node (e.g., x86, x64, ARM, etc.). As another example, the code may be written in a scripting language (e.g., Python, Ruby, Lua, JavaScript, etc.) that is interpreted and run on the processor of the storage node 106.

At block 404, the storage node 106 filters the data objects 206 stored in it according to the received instructions. As noted previously, each storage node 106 may maintain an index of locally available data objects 206 and/or data object fragments (e.g., a multi-part upload, Erasure Code, etc.). For example, a large data object may be stored across multiple nodes where a first portion of the data is stored as a first object on a first node, a second portion of the data is stored as a second object on a second node, and a parity object (e.g., Erasure Code) is stored on a third node. The object fragment boundaries (e.g., first object and second object) may be defined by the user or by the object storage system as part of storing the data. The index may be filtered at block 404 according to the selector information provided in the received instructions at block 402. The selector information may provide information for identifying data objects 206 of interest. Some examples of information include regular expressions, string comparisons, wildcards, etc. The selector information may incorporate bucket names, object names, prefixes, tags, and/or other metadata. That is, the data objects may be named according to a defined scheme in order to more easily find the data objects of interest. For example, data objects containing log data may be named "logs_yyyy_mm_dd" where "yyyy_mm_dd" identifies the year, month, and day that the logs were generated. Furthermore, the log objects may be stored in buckets named "logs" or "logs_yyyy" that allow for filtering on a larger scale (as an example).

At decision block 406, the storage node 106 determines whether any data objects 206 were identified by the filtering done at block 404. If it is determined that no data objects 206 were identified by the filtering, then the method 400 proceeds to block 408 where the method 400 ends with respect to the storage node 106 and the request received at block 402. That is, with no data objects 206 identified as matching the selector information, the storage node 106 does not run the executable object 208 as instructed, since there is no data at that node on which the executable object 208 is intended to run. If, instead, it is determined that one or more data objects 206 were identified by the filtering, then the method 400 proceeds to the decision block 410.

At decision block 410, the storage node 106 determines whether the requested executable object 208 is available (i.e., stored) on the storage node 106. As previously mentioned, the executable code may be included in the received instructions to be stored on the storage node 106 as an executable object 208. Alternatively, the executable object 208 may already be stored on the storage node 106. However, in some examples the executable object 208 may not be included in the instructions or already be stored on the storage node. If it is determined that that the executable object 208 is not stored on the storage node 106, then the method 400 proceeds to block 412.

At block 412, the storage node 106 pulls the executable object 208 from another storage node 106. For example, the storage node 106 may use the executable object ID included in the instructions received at block 402 to request the executable object 208 from another storage node 106. The other storage node 106 may be the storage node 106 that forwarded the instructions to the storage node 106 (e.g., nodes $106_1$ and $106_2$ of FIG. 2). Alternatively, the other storage node 106 may be identified by a general query of storage nodes 106 and/or the storage system controller, such as the load balancer 114. As another example, the other storage node 106 may be identified by an aggregated map with a larger view, such as a cluster-wide view, of the system 202. After sending the request for the executable object 208, the storage node 106 receives a copy of the executable object 208 and stores it. The method then proceeds to block 414.

If, instead, at decision block 410 it is determined that the executable object 208 is stored on the storage node 106 already, then the method 400 proceeds to block 414.

From either of blocks 410 and 412, at block 414 the storage node 106 generates a synthetic filesystem view of the data objects 206 identified at block 404. This may include converting the flat address space of the object storage system 202 to a hierarchical overlay that can be used to find the physical location of the objects. In some examples, this may include using characters in the object name, the bucket name, and/or metadata as delimiters to form a synthetic hierarchical view of the objects and define the directories. This may group similar objects into directories of the synthetic hierarchical view based on a naming convention (e.g., object name and/or bucket name) and/or metadata. For example, two objects named "log_2020-03-15_stationA" and "log_2020-03-15_stationB" may be stored in a bucket named "logs." The synthetic hierarchical view may be formed such that the first object is translated into a directory structure "logs/log/2020-03-15/stationA.txt" and the second object is translated into a directory structure "logs/log/2020-03-15/stationB.txt." The executable object 208 may then use the synthetic hierarchical view to find the first and second objects for processing as discussed further below. Alternatively, other characteristics of the objects may be used to define the directories of the synthetic hierarchical filesystem.

The synthetic filesystem view may assist the executable object 208 in addressing and processing the identified data objects 206. For example, the synthetic filesystem view may enable the executable object 208 to use kernel level translations to view data of the data objects 206 without expending the resources typically used with standard object access protocols. This may be useful, for example, when the executable object 208 includes legacy code (e.g., legacy code such as file access code designed to be used with a filesystem) that is designed for use with a traditional hierarchical filesystem; the legacy code may be reused in the executable object 208 with the use of the synthetic filesystem view. Where legacy code is not included as part of the executable object 208, generating a filesystem view may not be necessary such that block 414 may be optional. However, even if not necessary, generating a filesystem view may still be performed at block 414.

At block 416, the storage node 106 measures available resources in preparation to run the executable object 208. Resources available on the storage node 106 may include compute resources (e.g., processors) and memory resources (e.g., RAM, HDD, SDD, etc.), network resources (e.g., throughput), etc. In some embodiments, the compute resources that run the executable objects may be in the storage controllers 112. While the storage node 106 may use these resources heavily during the storage and retrieval of data objects for clients, for many object storage applications, especially after loading data into the storage node 106 is complete, the compute and memory resources may remain largely unused. Additionally, the compute resources of storages nodes 106 that are close to or at capacity may be largely unused as new data is not being written to the storage node 106 and reading data uses minimal resources. The storage node 106 measures these resources to ensure that the primary functions of data storage and retrieval might not be interrupted. When monitoring compute resources, the storage node 106 may monitor the current and historical processor load used for objects storage tasks (e.g., read, write, modify, etc.) as well as object execute tasks (e.g., running executable objects). The storage node 106 may store historical use data such as, for example, average workload, average idle time, peak workload, peak idle time, and/or time windows associated with each of those, just to name a few examples. For example, processor workloads may be the highest during normal work hours. Alternatively, the processor workload may be spread across the day when storing log file information. In some examples, a system administrator or other user may choose to deactivate the resource check at block 416 (or this may otherwise be an optional action).

At decision block 418, the storage node 106 determines whether there are sufficient available resources to run the executable object 208, based on the information obtained/determined from block 416. The storage node 106 may use a heuristic to determine whether there are sufficient resources. That is, even if there are available resources to run the executable object 208, the storage node 106 may determine that there are not sufficient resources if there is not a resource buffer to account for an uptick in resource use for the primary objectives of storing and/or retrieving data. Alternatively, the storage node 106 may determine that there are available resources whenever there is any spare capacity. In such a scenario, the storage node 106 may run the executable object 208, but may throttle the speed of execution to not impact the performance of object storage and retrieval.

If it is determined that there are not enough available resources to run the executable object 208, the method 400 returns to block 416 to measure the available resources until there are available resources. If, instead, it is determined that there are available resources, then the method 400 proceeds to block 420.

At block 420, the storage node 106 runs the executable object 208. The executable object 208 may process the data in the identified data objects 206 without transferring the data objects 206 out of the storage node 106 (i.e., bringing the compute action as close to the data objects 206 as possible). This may be referred to as in-place data-centric pipelining. Returning to the example of log files from block 404 for sake of a simple illustration, the executable object 208 may process the log files and identify any anomalies and/or errors of interest in less time than was traditionally possible with object storage by processing the data files locally in the storage node 106. Further, by processing at the storage node 106, there are fewer resources used transferring the data to a compute node (since transfer is not performed) and the overall process may be faster without the time requirements of transferring large amounts of data. The executable object 208 may run to completion, at which point the storage node 106 may return to handling data storage requests and waiting for instructions to run another executable object 208 (or, alternatively, the running of the executable object 208 may occur concurrent to handling data storage requests generally, based on availability of resources such as noted above with respect to block 416).

Figure 5:
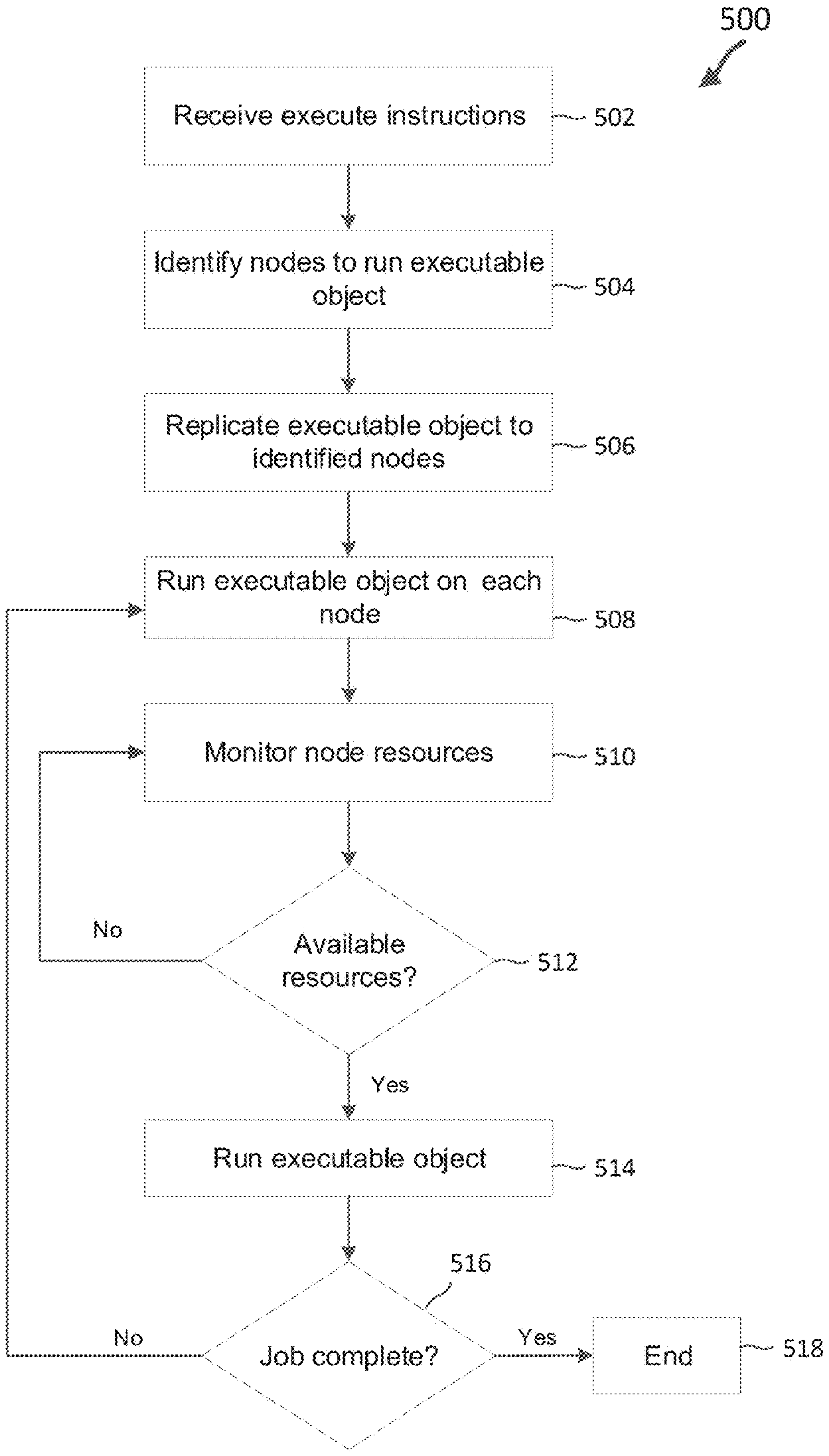
FIG. 5 illustrates a flow diagram of a method of running an executable object on more than one storage node of an object storage system according to embodiments of the present disclosure.

FIG. 5 illustrates a flow diagram of running an executable object on more than one storage node according to embodiments of the present disclosure. In the description of FIG. 5, reference is made to elements of FIGS. 1 and 2 for simplicity of illustration. In an embodiment, the method 500 may be implemented by exemplary storage nodes 106 that are part of a larger object storage system such as, for example, object storage system 202. In another embodiment, the method 500 may be implemented by exemplary storage controllers 112 that are part of storage nodes 106. The description below will describe this with respect to the storage system 202 and a group of storage nodes 106 as compared to the single storage node 106 implementation example of FIG. 4. It is understood that additional steps can be provided before, during, and after the steps of the method 500, and that some of the steps described can be replaced or eliminated for other embodiments of the method 500.

At block 502, the object storage system 202 receives instructions for running an executable object (e.g., executable object 208 of FIG. 2), from a client 214, similar to block 402 of FIG. 4. The instructions may include criteria for identifying data objects to process, such as selector information (e.g., regular expression, wildcards, string comparison, etc.). The instructions may also include executable code to be stored in an executable object 208 and/or the object ID of an executable object to be used to process the identified data. The instructions may be received using an object storage protocol such as, for example, S3, Azure, Swift, etc. In some embodiments, the object storage protocol may be extended to include additional headers designed specifically for handling executable objects 208 on the object storage system 202.

At block 504, the object storage system 202 identifies which storage nodes 106 on which to run the executable object 208. Storage nodes 106 that store one or more data objects 206 identified by the execute instructions are part of a group of storage nodes 106 that will run the executable object 208. In some embodiments, the storage system 202 may identify which nodes 106 store data objects 206 based on a cluster-wide index of data object locations. The cluster-wide index may include information such as bucket names, object names, prefixes, tags, and/or other metadata. The execute instructions may then be forwarded to the identified storage nodes 106. In some other embodiments, storage nodes 106 within the object storage system 202 may receive the instructions and may maintain their own index of object locations. The local storage node index may include bucket names, object names, prefixes, tags, and/or other metadata. The storage nodes 106 may receive the instructions from the object storage system 202 and filter their own index to identify one or more data objects 206 based on the instructions.

At block 506, the object storage system 202 replicates the executable object 208 to the identified storage nodes 106 (e.g., when the executable object 208 is not already present at the given storage nodes 106). As previously discussed, the executable objects 208 may be replicated to the different storage nodes 106 using either a push or a pull paradigm. When using a push paradigm, the executable object 208 that is included in the received instructions or that is identified by the received instructions is pushed to the different storage nodes 106 along with the instructions. In one example, the executable object 208 and instructions are pushed to every storage node 106 in the object storage system 202, regardless of whether every storage node 106 needs the executable object 208 and/or has data objects 206 relevant to that executable object 208. In another example, the executable object 208 and the instructions are pushed to only those storage nodes 106 identified by the object storage system 202 as storing data objects identified by the received instructions (e.g., identified by the cluster-wide index).

When using the pull paradigm, the instructions are sent to the different storage nodes 106 within the object storage system 202 along with the object ID of the executable object 208 identified in block 502, instead of the executable object 208 itself. In this example, each storage node 106 may use the instructions so received to determine whether data objects 206 identified by the instructions are stored on the respective storage node 106. By way of example and reference to FIG. 2, if one or more data objects $\mathbf{206}_1$-$\mathbf{206}_n$ identified by the instructions are stored on the storage node $\mathbf{106}_1$, then the storage node $\mathbf{106}_1$ requests (i.e., pulls) the executable object 208 from a storage node $\mathbf{106}_2$. This may correspond to a situation where the executable object 208 is not already stored on the storage node $\mathbf{106}_1$. In this particular example, the storage node $\mathbf{106}_1$ may pull the executable object 208 because the executable object 208 is already at the storage $\mathbf{106}_2$, or was received as part of block 502 at the storage node $\mathbf{106}_2$.

At block 508, the different storage nodes 106 identified as storing data objects 206 identified by the instructions (received at block 502) begin the process of running the executable object 208. In one embodiment, the storage nodes 106 may run the executable object 208 in parallel. That is, each storage node 106 runs the executable object 208 at the same time (or overlapping times), storage node resources permitting. In another embodiment, the storage nodes 106 may run the executable object 208 serially. That is, the executable object 208 may run on a first storage node $\mathbf{106}_1$ (to give a specific example with reference to FIG. 2 again) to completion before running on a second storage node $\mathbf{106}_2$. Running executable objects 208 serially on multiple different nodes may be used when the content of a data object 206 is stored across multiple storage nodes 106, such as with object data fragments associated with multipart uploads.

The following discussion will be used to further illustrate this concept. The principles discussed below may be equally applied to running executable objects 208 in parallel on different storage nodes 106 except that the executable objects 208 may be running concurrently. Therefore, in this discussion related to serially running the executable object 208, at block 508 a first storage node 106 is selected. A different storage node 106 may be selected for each iteration of the method 500.

At block 510, the selected storage node 106 monitors its resource use, such as discussed above with respect to block 416 of FIG. 4. The selected storage node 106 may monitor resources at regular intervals so as to minimize the effect of the monitoring on the resources. In other examples, monitoring may be done continually. When monitoring compute resources, the storage node 106 may monitor the current and historical processor load used for objects storage tasks (e.g., read, write, modify, etc.) as well as object execute tasks (e.g., running executable objects). The storage node 106 may store historical use data such as, for example, average workload, average idle time, peak workload, peak idle time, and/or time windows associated with each of those, just to name a few examples. For example, processor workloads may be the highest during normal work hours. Alternatively, the processor workload may be spread across the day when storing log file information. The object storage system 202, as an example the load balancer 114, may minimize the difference between each of the above examples in order to keep the processor workload mostly consistent across storage nodes 106. Because of this, storage nodes 106 may generally have idle processor time that can be used to run executable objects 208 on the given storage node 106. The storage node 106 may also monitor memory resources to ensure that there is sufficient memory to run the executable object 208. As noted at block 416 as well, block 510 may be an optional action.

At decision block 512, the selected storage node 106 determines whether there are sufficient resources to run the executable object 208. The decision may be made based on the current resource load of the selected storage node 106. Additionally, or alternatively, the decision may be made based on a time window in order to average the resource use to more accurately determine resource availability. If it is determined that there are not sufficient available resources, then the method 500 returns to block 510 to continue monitoring resources while the selected storage node 106 performs its object storage tasks (e.g., ready, write, modify, etc.). If, instead, it is determined that there are sufficient available resources, the method 500 proceeds to block 514 (and, if block 510 is optional and not included, the method 500 proceeds from block 508 to block 514).

At block 514, the selected storage node 106 runs the executable object 208. The executable object 208 may process the identified data objects 206 while it is running, according to the operations specified in the executable code of the executable object 208. The executable object 208 may also communicate with a client-side application while it is running. In some embodiments, the executable object 208 is given discrete processor time slices to run that are interleaved with object storage processing so as to not entirely interrupt the object storage tasks of the selected storage node 106. For example, the selected storage node 106 may run the executable object 208 for a first time slice. The selected storage node 106 may then perform object storage tasks (e.g., read, write, etc.) for a second time slice while the executable object has not finished processing data objects, effectively pausing the executable object 208. The selected storage node 106 may then resume running the executable object 208 for a third time slice. As another example, both running of the executable object 208 and other object storage tasks may occur concurrently to each other (e.g., where system resources are sufficient to allow it). In some other embodiments, the selected storage node 106 may include multiple processors and/or cores where a first portion of the processors and/or cores may be dedicated to object storage tasks and a second portion of the processors and/or cores may be dedicated to running executable objects. Dividing the processors and/or cores this way may provide predictable performance for the executable objects without degrading the performance of the object storage tasks. In some examples, each storage node 106 may have between 8 and 80 processors and/or cores (as a non-limiting example). In yet other embodiments, the selected storage node 106's multiple processors and/or cores may dynamically assign some portion of the processors and/or cores to object storage tasks, and another portion to running executable objects, and may adjust over time how many processors and/or cores are assigned to each portion depending on a variety of factors, such as current system load and/or user request (to name just a few examples). Further, some combination of a dedicated number of processors and/or cores and dynamically assigned processors and/or cores (e.g., a minimum number specified as dedicated to provide a baseline of predictable performance for executable objects or object storage tasks, with more dynamically assigned when available or reassigned if not).

At decision block 516, the selected storage node 106 determines whether the executable object 208's task is complete. After the executable object 208 has finished its task, the selected storage node 106 may determine that the task is complete with respect to that node. The selected storage node 106 may further determine whether there are any other storage nodes 106 that are suspended and waiting for the selected storage node 106 to complete processing of the executable object 208. When executing serially, only one of the storage nodes 106, the selected storage node 106, is in an active execution state with respect to an executable object 208 while the remaining storage nodes 106 are suspended for that executable object 208 (or another executable object 208 that relies upon a result of the first executable object 208 completing). If it is determined that the job is complete and that all parts of the data objects across the one or more storage nodes 106 have been processed, the method 500 proceeds to block 518 and ends. If, instead, it is determined not all parts of the identified data objects have been processed and/or that one or more storage nodes 106 remain to run, then the method 500 returns to block 508 to select the next storage node 106. The currently selected storage node 106 may be suspended or terminated and the active execution state may be passed to the next selected storage node 106.

Figure 6:
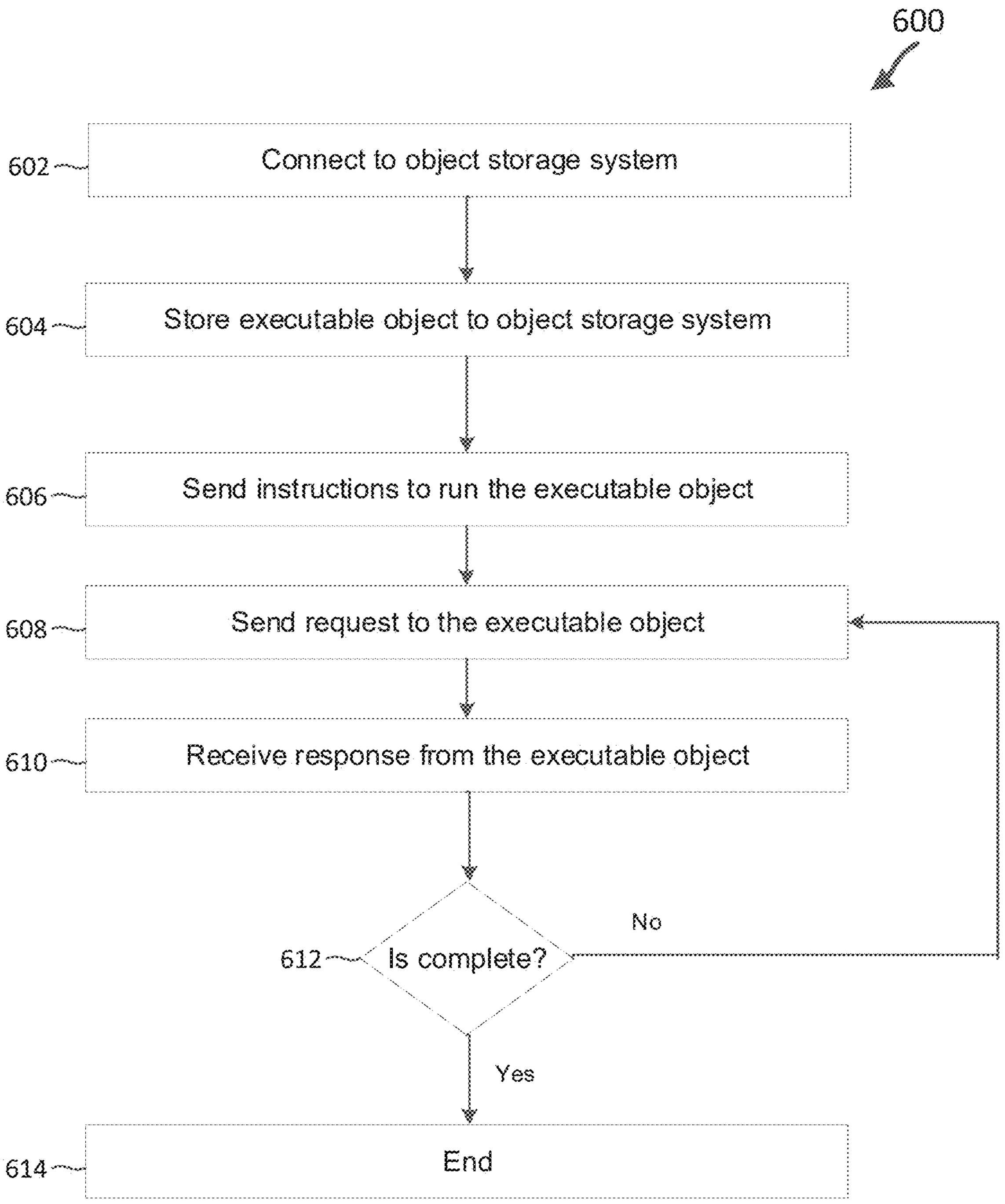
FIG. 6 illustrates a flow diagram of a method of running a client-side application using an executable object that is running on a storage node of an object storage system according to embodiments of the present disclosure.

FIG. 6 illustrates a flow diagram of running a client-side application including an executable object component running on a storage node according to embodiments of the present disclosure. In the description of FIG. 6, reference is made to elements of FIGS. 1 and 2 for simplicity of illustration. In an embodiment, the method 600 may be implemented by an exemplary client 214 that is communicating with an object storage system such as, for example, object storage system 202. It is understood that additional steps can be provided before, during, and after the steps of the method 600, and that some of the steps described can be replaced or eliminated for other embodiments of the method 600.

At block 602, the client 214 connects to the object storage system 202. The client 214 may use an object storage protocol (e.g., S3, Azure, Swift, etc.) to communicate with the object storage system. The object storage protocol may be unmodified, or modified/extended as noted elsewhere herein. The client 214 may connect to the object storage system over a network such as network 118 or network 204 described above.

At block 604, the client 204 may store an executable object 208 on the object storage system 202. That is, the client 204 may send an instruction to the object storage system 202 to store the executable object 208. The client 214 may use the object storage protocol to store executable code as the executable object 208 within the object storage system 202. In some embodiments, the object storage protocol may be extended to include additional headers related to the creation, storage, modification, and execution of executable objects 208 within the object storage system 202. For example, a new header may be added that identifies the object to be stored as an executable object 208 as opposed to a data object 206. A data object 206 includes data that is read, written, and/or modified. In contrast, an executable object 208 includes executable code that is intended to be run by the object storage system 202. As another example, a new header may be added that allows the client 214 to modify the metadata of the executable object 208 to grant it execution rights and permissions to execute. As another example, a new header may be added that identifies an executable object 208 to be run by the object storage system 202 (e.g., by a storage node 106, storage controller 112, etc.). Although it is not necessary to extend the object storage protocol, doing so may reduce the chances for errors to occur in distinguishing between data objects 206 and executable objects 208 and thereby improve the reliability of the object storage system 202.

At block 606, the client 204 sends instructions to the object storage system 202 to run the executable object 208. The instructions may be sent using the object storage protocol. The instructions may identify which executable object 208 (or plural objects 208) to run. The instructions may further identify a set of data objects 206 to be processed by the by the executable object 208. For example, the instructions may include a regular expression, a string for comparison, or another way to identify a set of data objects 206.

At block 608, the client 204 may send a request to the executable object 208 while the executable object 208 is running. Once the executable object 208 is running on the object storage system 202, the client 214 may communicate directly with the executable object 208 without using the object storage protocol. This may be accomplished, for example, by using an application specific API designed to handle the communication between the client-side application and the executable objects. Some examples may be implemented using HTTP, JSON, XML, or another RESTful API.

At block 610, the client 214 receives a response from the executable object 208. The response may be sent from the executable object 208 to the client 214, without going through other elements of the object storage system 202. The response may be sent using a protocol other than the object storage protocol.

At decision block 612, the client 214 determines whether the task being performed by the executable object 208 is complete. If it is determined that the task is not complete, the method 600 returns to block 608 where the client 214 may communicate with the executable object 208 (if the client 214 desires any information such as a status update while the executable object 208 is still running). If, instead, it is determined that the task is complete, the method 600 then proceeds to block 614.

At block 614, the processing task being performed by the executable object 208 is complete. While the processing task may be complete, the client 214 may continue running the client-side application that had requested the processing by the executable object 208. The client 214 may determine whether or not to terminate the executable object 208 running on the storage system 202. For example, the client 214 may decide to leave the executable object 208 running in an idle state on the object storage system 202 (e.g., only listening for further requests) in anticipation of requesting further information from the executable object 208. Alternatively, the client 214 may decide to send a request to the executable object 208 running on the object storage system 202 to shutdown in order to free resources of the object storage system 202.

A continuous security monitoring tool may be an exemplary implementation of the method 600 and of executable objects more generally. The continuous security monitoring tool, referred to as "the application" below, may store data in an object storage system, such as the object storage system 202. The stored data may include computer logs, network logs, business operation data, etc. The object storage system may include local and cloud storage nodes. The data may be stored across one or more local and/or cloud storage nodes of the object storage platform.

As the data is generated it may be stored in the object storage system by one or more clients 214. The data may be stored according to a naming scheme. For example, computer logs may be stored in a bucket named "computer logs" and each object may be named according to a naming scheme of "cl_yyyy_mm_dd" where each object represents the logs for a specific day identified by the four digit year, the two digit month, and the two digit day. The network logs may be stored in a bucket named "network logs" and each object may be named according to a naming scheme of "nl_yyyy_mm_dd" where each object represents the logs for a specific day identified by the four digit year, the two digit month, and the two digit day. The business operation data may be stored in a bucket named "op data" and each object may be named according to a naming scheme of "od_div_yyyy_ww" where each object represents the data of a specific division identified by "div" and by time frame such as a four digit year and a two digit week. Each storage node may store portions of one or more buckets. Each bucket may be stored on one or more storage nodes. Each object may be stored entirely or partially within one or more storage nodes.

In order to derive value from the data (e.g., access, process, use, etc.) the continuous security monitoring tool may have, in the past, had to copy the data objects from the object storage system to one or more compute nodes for processing. The compute node may be as simple as a user's desktop computer or as complicated as a cloud-based processing system. Copying all of the objects to the one or more compute nodes may use a large number of resources including computing resources, network resources, time, money, etc.

An improved way to derive value from the data stored in the object storage system is to use the object storage system as the compute nodes using executable objects according to embodiments of the present disclosure described above (and further below in the examples). Doing so allows the application to process the data in place on the object storage system without the expense (e.g., cost and resources) of transferring large amounts of data out of the object storage system for processing. The executable objects may contain code designed to be run on the object storage system (e.g., hardware, scripting, virtual machine, etc.).

In an exemplary implementation, the application may store the code as an executable object on the object storage system. The application may send instructions to the object storage system to run the executable object. The instructions may also include selector information for identifying the set of data objects of interest. For example, the data objects of interest may be computer log objects. The selector information would then identify only those objects stored in the "computer log" bucket(s). As another example, the data objects of interest may be network log objects from a specific year, such as 2019. The selector information would then identify only those objects in the "network logs" bucket(s) that are named "nl_2019_*". As another example, the objects of interest may be all objects from a specific year and month, such as March of 2019. The selector information would then identify only those objects that are named "*_2019_03_*" or match the regular expression "/2019_(09|1[0-3])/" to identify objects named for March of 2019 that are named with the weeks of "08"-"13" of the year 2019, which are the week numbers that overlap with March of 2019. Each storage node that includes the data objects of interest may then run the executable object. At this point, the application may communicate directly with the one or more executable objects running on the storage nodes of the object storage system. Then, instead of copying all of the objects from the object storage system, the executable objects may return the information requested by the application, thereby improving the overall efficiency and performance of the different systems involved in the process (e.g., client, storage, compute, etc.).

A genomics application may be another exemplary implementation of the method 600 and executable objects more generally. An exemplary genomics application may store gene sequencing data to an object storage system. Similar to the continuous security monitoring tool, the genomics application may store the data in buckets according to a naming scheme and may name the objects containing the data according to a naming scheme. The naming scheme may be used for identifying objects to be processed by the genomics application. Each object may also include metadata for identifying markers included in the data that is stored in each of the objects. In this example, the metadata is set at the time that the data is stored in the object storage system. Genomics data can include exabytes of information about gene sequences that is built up over time.

There arise instances when researchers learn that they need to look for new markers in the already stored data and update the metadata. One approach to this task is to copy the data out of the object storage system, scan the data for the specific marker sequence, update the metadata, and store the updated objects back to the object storage system. The amount of time and resources to transfer, analyze, update, and transfer even a subset of exabytes of data is very large. With object storage systems charging for data to be transferred from the object storage system, the cost of performing these large transfers may also be factored into the resources required to perform this update. Alternatively, executable objects may be implemented that work with the genomics application to run on the object storage system. By doing so, the executable objects may analyze and update the data in place on the object storage system without the need to perform large data transfers from the object storage system and back to the object storage system. Therefore, the overall efficiency of the process is improved and the cost of performing the analysis is decreased by not having to pay to transfer all of the data out of the object storage system.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

storing, by an object storage node that comprises a storage controller and an object storage device configured to store a plurality of data objects, an executable object in the object storage device among the plurality of data objects, the executable object comprising executable code to be run by the object storage device;

receiving, by the object storage node from a client device, a request to run the executable object in the object storage device;

identifying, by the object storage node, one or more data objects stored on the object storage device of the object storage node to be processed by the executable object;

aggregating, by the object storage node, the one or more data objects for processing by the executable object on the object storage device; and running, by the object storage node instead of a separate compute node associated with the storage controller, the executable object on idle resources of the object storage device to process the one or more data objects stored on the object storage device, wherein the idle resources are unallocated to any current read or write operations initiated by the client device.

2. The method of claim 1, wherein the object storage node is a first object storage node, the one or more data objects are a first set of data objects, and the executable object is a first instance of the executable object, the method further comprising:

storing, by a second object storage node that comprises a second storage controller and a second object storage device, a second instance of the executable object on the second object storage device of the second object storage node;

identifying, by the second object storage node, a second set of data objects including one or more data objects to be processed by the second instance of the executable object; and running, by the second object storage node, the second instance of the executable object on the second object storage device to process the second set of data objects stored on the second object storage device.

3. The method of claim 1, wherein the request to run the executable object further includes at least one data object selection criteria for identifying the one or more data objects stored on the object storage device for the executable object to process.

4. The method of claim 1, wherein the object storage node is a first object storage node, the executable object is a first instance of the executable object and the one or more data objects are a first set of data objects, the method further comprising:

requesting, by a second object storage node that comprises a second storage controller and a second object storage device, a copy of the executable object from the object storage device of the first object storage node in response to identifying a second set of data objects to be processed by the executable object, the second set of data objects being stored on the second object storage device of the second object storage node; and storing, by the second object storage node, the executable object on the second object storage device of the second object storage node as a second instance of the executable object.

5. The method of claim 1, wherein the aggregating the one or more data objects further includes generating a hierarchical filesystem view for use by the executable object, the hierarchical filesystem view being generated from an index listing of one or more identified objects.

6. The method of claim 1, further comprising:

monitoring, by the object storage node, available resources of the object storage device; and before running the executable object, determining, by the object storage node, that there is a resource buffer of available resources to run the executable object.

7. The method of claim 1, wherein the object storage node is a first object storage node and the executable object is a first instance of the executable object, the method further comprising:

running, by the first object storage node, the first instance of the executable object on the object storage device of the first object storage node while a second instance of the executable object on a second object storage device of a second object storage node is in an inactive execution state;

setting, by the first object storage node, the first instance of the executable object on the object storage device of the first object storage node to an inactive execution state in response to completing processing of the one or more data objects; and transferring, by the first object storage node, an active execution state to the second instance of the executable object running on the second object storage device of the second object storage node.

8. A first storage node comprising:

a storage controller and a first object storage device, wherein the first object storage device comprises a memory containing machine readable medium comprising machine executable code having stored thereon instructions for performing a method of running an executable object on the first object storage device in an object storage system; and the first object storage device further comprises a processor coupled to the memory, the processor configured to execute the machine executable code to cause the processor to:

receive, by the first storage node of the object storage system from a client device, an execute instruction for running an executable object to process one or more data objects of interest, the executable object comprising executable code to be run by the first object storage device of the first storage node in the object storage system;

identify, by the first storage node, a first set of the one or more data objects to be processed by the executable object in the object storage system, the first set of the one or more data objects being stored on the first object storage device with the executable object;

receive, by the first storage node, a request from a second storage node of the object storage system for the executable object in response to a second set of the one or more data objects being located on a second object storage device of the second storage node;

send, by the first storage node, a copy of the executable object to the second storage node in response to the request from the second storage node; and run, by the first storage node instead of a separate compute node associated with the storage controller, the executable object on idle resources of the first object storage device to process the first set of the one or more data objects stored on the first object storage device in response to being in an active execution state, wherein the idle resources are unallocated to any current read or write operations initiated by the client device.

9. The first storage node of claim 8, wherein the execute instruction further includes at least one criterion to identify the data objects of interest and an object ID identifying the executable object.

10. The first storage node of claim 8, further comprising machine executable code that causes the processor to:

monitor, by the first storage node, available resources of the first object storage device, including processor resources and memory resources; and determine, by the first storage node, that there is a buffer of resources available to run the executable object.

11. The first storage node of claim 8, further comprising machine executable code that causes the processor to:

determine, by the first storage node, to pass the active execution state to the second storage node in response to the first object storage device of the first storage node completing the processing of the first set of the one or more data objects.

12. The first storage node of claim 8, wherein the second set of the data objects of interest are different than the first set of the data objects of interest and being stored on the second object storage device of the second storage node.

13. The first storage node of claim 8, further comprising machine executable code that causes the processor to:

store, by the first storage node, executable code as the executable object on the first object storage device of the first storage node, the executable code being received in an execute request with the execute instruction.

14. A non-transitory machine-readable medium of a first object storage device having stored thereon instructions for performing a method of running an executable object on the first object storage device, the first object storage device being part of a first object storage node in an object storage system comprising a flat address space and the first object storage node further comprising a storage controller, when executed by at least one machine of the first object storage device, causes the at least one machine to:

receive, by the first object storage node of the object storage system, execute instructions from a client for running the executable object on the first object storage device of the first object storage node, the executable object comprising executable code to be run by the first object storage device of the first object storage node in the object storage system;

identify, by the first object storage node, a first set of data objects to be processed by the executable object on the first object storage device;

run, by the first object storage node instead of a separate compute node associated with the storage controller, the executable object on idle resources of the first storage object device to process the first set of data objects that are on the first storage object device with the executable object, wherein the idle resources are unallocated to any current read or write operations initiated by the client device;

receive, by the first object storage node, a request from the client for information about the first set of data objects while running the executable object on the first object storage device, the request from the client bypassing the object storage system; and send, by the first object storage node, a response to the request from the client, the response bypassing the object storage system when sent to the client.

15. The non-transitory machine-readable medium of claim 14, further comprising machine executable code that causes the machine to:

receive, by the first object storage node, a request from a second object storage node of the object storage system for the executable object in response one or more data objects being located at a second object storage device of the second object storage node; and send, by the first object storage node, a copy of the executable object to the second object storage device of the second object storage node in response to the request from the second object storage node.

16. The non-transitory machine-readable medium of claim 15, wherein the executable object runs concurrently on the first object storage device of the first object storage node and the second object storage device of the second object storage node.

17. The non-transitory machine-readable medium of claim 14, wherein identification of the first set of data objects further includes machine executable code that causes the machine to:

filter a local index of data objects stored on the first object storage device of the first object storage node, the filtering being based on selection criteria included in the execute instructions.

18. The non-transitory machine-readable medium of claim 14, further comprising machine executable code that causes the machine to:

pause, by the first object storage device of the first object storage node, the executable object on the first object storage device;

perform, by the first object storage device of the first object storage node, one or more object storage tasks; and resume, by the first object storage device of the first object storage node, running the executable object.

19. The non-transitory machine-readable medium of claim 14, further comprising machine executable code that causes the machine to:

generate, by the first object storage node, a location map of physical locations of the first set of data objects identified by the first object storage node.

20. The method of claim 1, further comprising:

receiving, by the object storage node from the client device prior to the storing, the executable object for storage in the object storage device of the object storage node.

* * * * *